US012417749B2

(12) United States Patent
Mazrouei et al.

(10) Patent No.: US 12,417,749 B2
(45) Date of Patent: Sep. 16, 2025

(54) COLOR CORRECTION CIRCUIT DEVICE AND DISPLAY SYSTEM

(71) Applicant: SEIKO EPSON CORPORATION, Tokyo (JP)

(72) Inventors: Sebdani mahmood Mazrouei, Markham (CA); Stanislav Zaozerskii, Richmond (CA); Kumar anandabairavasamy Anand, Richmond (CA)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/788,303

(22) Filed: Jul. 30, 2024

(65) Prior Publication Data

US 2025/0046262 A1 Feb. 6, 2025

(30) Foreign Application Priority Data

Jul. 31, 2023 (JP) ................................ 2023-124197

(51) Int. Cl.
*G09G 3/34* (2006.01)
*G09G 3/00* (2006.01)

(52) U.S. Cl.
CPC .......... *G09G 3/3426* (2013.01); *G09G 3/006* (2013.01); *G09G 2300/026* (2013.01); *G09G 2320/0233* (2013.01); *G09G 2320/0242* (2013.01); *G09G 2320/0646* (2013.01)

(58) Field of Classification Search
CPC ............................................... G09G 2320/023
See application file for complete search history.

(56) References Cited

U.S. PATENT DOCUMENTS

2012/0032969 A1* 2/2012 Sugiyama ............ G06F 3/1431 345/589
2021/0193066 A1 6/2021 Anand et al.

FOREIGN PATENT DOCUMENTS

JP 2021-009170 A 1/2021
JP 2021-101199 A 7/2021

* cited by examiner

*Primary Examiner* — Gustavo Polo
(74) *Attorney, Agent, or Firm* — Harness, Dickey & Pierce, P.L.C.

(57) ABSTRACT

A circuit device includes a luminance analysis circuit, a dimmer circuit, a first color correction circuit, and a second color correction circuit. The luminance analysis circuit performs luminance analysis and resolution reduction on image data of an input image to output luminance information having resolution lower than that of the input image. The dimmer circuit determines, according to the luminance information, light source luminance information indicating light-emission luminance at which each of light source elements emits light. The first color correction circuit performs color correction on first split image data corresponding to a first area of a display panel, based on the light source luminance information. The second color correction circuit performs color correction on second split image data corresponding to a second area of the display panel, based on the light source luminance information.

10 Claims, 17 Drawing Sheets

FIG. 7

IMA1 x →, y ↓

| | 1 | 2 | 3 | 4 | 5 | 6 | 7 | 8 |
|---|---|---|---|---|---|---|---|---|
| 1 | P0 | P1 | P2 | P3 | P4 | P5 | P6 | P7 |
| 2 | P16 | P17 | P18 | P19 | P20 | P21 | P22 | P23 |
| 3 | P32 | P33 | P34 | P35 | P36 | P37 | P38 | P39 |
| 4 | P48 | P49 | P50 | P51 | P52 | P53 | P54 | P55 |
| | | | | ⋮ | | | | |

FIG. 8

IMA2 x →, y ↓

| | 1 | 2 | 3 | 4 | 5 | 6 | 7 | 8 |
|---|---|---|---|---|---|---|---|---|
| 1 | P8 | P9 | P10 | P11 | P12 | P13 | P14 | P15 |
| 2 | P24 | P25 | P26 | P27 | P28 | P29 | P30 | P31 |
| 3 | P40 | P41 | P42 | P43 | P44 | P45 | P46 | P47 |
| 4 | P56 | P57 | P58 | P59 | P60 | P61 | P62 | P63 |
| | | | | ⋮ | | | | |

FIG. 10

INT

| y \ x | 1 | 2 | 3 | 4 | 5 | 6 | 7 | 8 |
|---|---|---|---|---|---|---|---|---|
| 1 | INT0 (P0,P1, P16,P17) | INT1 (P2,P3, P18,P19) | INT2 (P4,P5, P20,P21) | INT3 (P6,P7, P22,P23) | INT4 (P8,P9, P24,P25) | INT5 (P10,P11, P26,P27) | INT6 (P12,P13, P28,P29) | INT7 (P14,P15, P30,P31) |
| 2 | INT8 (P32,P33, P48,P49) | INT9 (P34,P35, P50,P51) | INT10 (P36,P37, P52,P53) | INT11 (P38,P39, P54,P55) | INT12 (P40,P41, P56,P57) | INT13 (P42,P43, P58,P59) | INT14 (P44,P45, P60,P61) | INT15 (P46,P47, P62,P63) |
| | | | | ... | | | | |

COLOR CORRECTION CIRCUIT DEVICE AND DISPLAY SYSTEM

The present application is based on, and claims priority from JP Application Serial Number 2023-124197, filed Jul. 31, 2023, the disclosure of which is hereby incorporated by reference herein in its entirety.

BACKGROUND

1. Technical Field

The present disclosure relates to a circuit device, a display system, and the like.

2. Related Art

JP-A-2021-9170 discloses a display device including a backlight light-emission intensity determination unit and a display data generation unit. The backlight emission intensity determination unit determines a light emission intensity of a light source for each control area of the backlight. The display data generation unit generates image data after correction based on the light emission intensity data acquired from the backlight light-emission intensity determination unit.

As resolution of an image increases, a speed of local dimming processing based on the image data increases. However, there is a case where the speed of the local dimming processing is desired to be reduced in conformity with the processing speed of a circuit device. JP-A-2021-9170 described above does not disclose an appropriate method for reducing a calculation speed in regard to each of the backlight light-emission intensity determination unit and the display data generation unit related to the local dimming processing.

SUMMARY

An aspect of the present disclosure relates to a circuit device that controls a display device including light source elements and a display panel. The circuit device includes a luminance analysis circuit that performs luminance analysis and resolution reduction on image data of an input image to output luminance information having a resolution lower than a resolution of the input image, a dimmer circuit that determines, according to the luminance information, light source luminance information indicating light-emission luminance at which each of the light source elements emits light, a first color correction circuit that performs color correction on first split image data, out of the image data, corresponding to a first area of the display panel, based on the light source luminance information, and a second color correction circuit that performs color correction on second split image data, out of the image data, corresponding to a second area of the display panel, based on the light source luminance information.

Another aspect of the present disclosure relates to a display system including the circuit device and the display device.

BRIEF DESCRIPTION OF THE DRAWINGS

FIG. 7 is a diagram illustrating an example of first split image data;

FIG. 8 is a diagram illustrating an example of second split image data;

FIG. 10 is a diagram illustrating an example of pixel data of luminance information;

DESCRIPTION OF EMBODIMENTS

Hereinafter, a preferred embodiment of the present disclosure will be described in detail. It should be noted that the present embodiment described below is not intended to unduly limit the content described in the scope of claims, and all components described in the present embodiment are not necessarily essential requirements.

1. Electronic Apparatus, Display System, and Circuit Device

Figure 1:
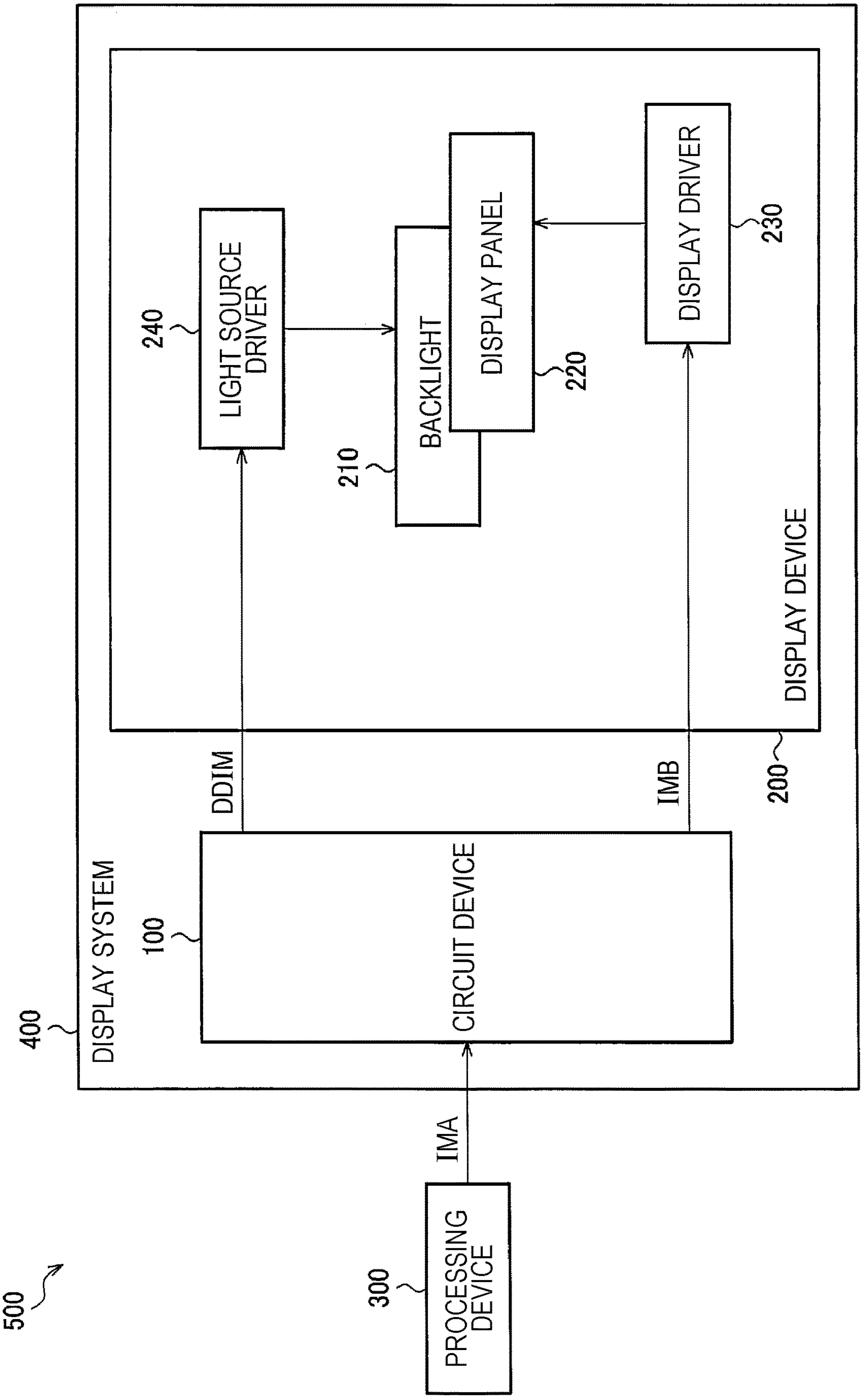
FIG. 1 is a diagram illustrating an example of a configuration of an electronic apparatus.

FIG. 1 illustrates an example of a configuration of an electronic apparatus including a display system of the present embodiment. An electronic apparatus 500 includes a processing device 300 and a display system 400. An example of the electronic apparatus 500 may be an in-vehicle display apparatus including a meter panel, a center information display, a head-up display, or an electronic mirror, a television apparatus, or an information processing apparatus including a display.

The display system 400 includes a circuit device 100 and a display device 200. The circuit device 100 is, for example, an integrated circuit device in which circuit elements are integrated on a semiconductor substrate. Although the circuit device 100 and the display device 200 are illustrated as separate components in FIG. 1, the circuit device 100 may be provided in the display device 200.

The display device 200 includes a backlight 210, a display panel 220, a display driver 230, and a light source driver 240. An example of the display device 200 is a display used for a television apparatus, an information processing apparatus, or the like. Alternatively, the display device 200 may be, for example, a head-mounted display including a projection device for eyes, or a head-up display including a projection device for a screen. When the display device 200 is a head-up display, the display device 200 further includes an optical system for projecting, onto a screen, light emitted from the backlight 210 and transmitted through the display panel 220.

In plan view of the backlight 210, light source elements are two-dimensionally arranged in the backlight 210. The light source elements are light-emitting elements that emit light by power supply, and are, for example, inorganic light-emitting diodes or organic light-emitting diodes. In local dimming control, the amounts of light of the two-dimensionally arranged light source elements are controlled independently of each other. Alternatively, the backlight 210 may be divided into areas. In plan view, light source elements are arranged in each of the areas. The light source elements arranged in an area are controlled to have the same amount of light, and the amounts of light of the respective areas are controlled independently of each other.

An example of the two-dimensional arrangement of the light source elements is a square arrangement in which the light source elements are arranged at all intersections of rows and columns. However, the two-dimensional arrangement is not limited to the square arrangement. For example, the two-dimensional arrangement may be an arrangement called, for example, a rhomboid arrangement or a zigzag arrangement. In this arrangement, the light source elements are arranged at the intersections of the odd-numbered columns and either of the odd-numbered rows or the even-numbered rows, and at the intersections of the even-numbered columns and the other of the odd-numbered rows and the even-numbered rows, and the light source elements are not arranged at the other intersections.

The light source driver 240 receives light source luminance data DDIM from the circuit device 100 and drives each of the light source elements of the backlight 210 based on the light source luminance data DDIM. The light source driver 240 is, for example, an integrated circuit device. Two or more light source drivers may be provided, and each of the light source drivers may be a separate integrated circuit device.

The display panel 220 is an electro-optical panel through which light from the backlight 210 is transmitted and which displays an image by controlling of a transmittance thereof. For example, the display panel 220 is a liquid crystal display panel.

The display driver 230 receives, from the circuit device 100, image data IMB and a timing control signal for controlling a display timing. The display driver 230 drives the display panel based on the received image data IMB and timing control signal to display an image on the display panel 220.

The processing device 300 transmits image data IMA to the circuit device 100. The processing device 300 is a processor such as a CPU, a GPU, a microcomputer, a DSP, an ASIC, or an FPGA. CPU is an abbreviation for Central Processing Unit. GPU is an abbreviation for Graphics Processing Unit. DSP is an abbreviation for Digital Signal Processor. ASIC is an abbreviation for Application Specific Integrated Circuit. FPGA is an abbreviation for Field Programmable Gate Array.

The circuit device 100 receives the image data IMA and performs local dimming processing of the display device 200 based on the image data IMA. The circuit device 100 performs dimming on light-emission luminance of each light source element of the backlight 210 or each area of the backlight 210 according to luminance of the image data IMA and outputs light source luminance information, which is obtained by the dimming, to the light source driver 240 as light source luminance data DDIM. The circuit device 100 performs, based on the light source luminance information, color correction on the image data IMA and outputs the image data IMB after the color correction to the display driver 230.

The circuit device 100 incorporates a function of a display controller. In other words, the circuit device 100 transmits the image data IMB and the timing control signal for controlling the display timing to the display driver 230. Further, the circuit device 100 may perform image processing such as gradation correction, white balance correction, or scaling on the image data IMA or the image data IMB. The circuit device 100 does not necessarily incorporate the function of the display controller, and a display controller may be provided as an integrated circuit device separate from the circuit device 100. In this case, the display controller may be provided in the display device 200. The display controller and the display driver 230 may be configured by separate integrated circuit devices from each other or may be configured by a single integrated circuit device.

Figure 2:
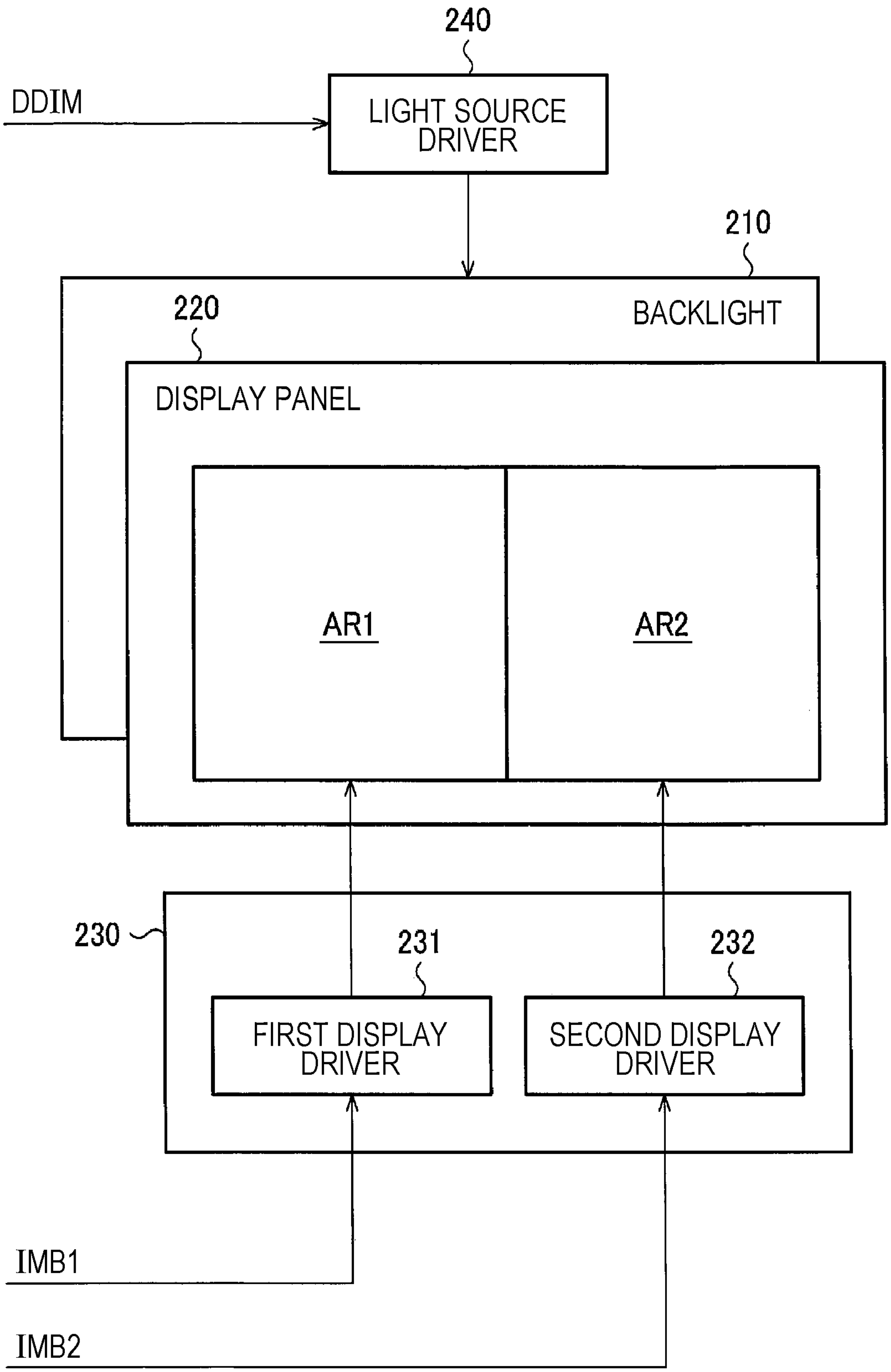
FIG. 2 is a diagram illustrating an example of a detailed configuration of a display driver.

FIG. 2 illustrates an example of a detailed configuration of the display driver. The display driver 230 includes a first display driver 231 and a second display driver 232.

The first display driver 231 receives first output image data IMB1 from the circuit device 100. The second display driver 232 receives second output image data IMB2 from the circuit device 100. The first output image data IMB1 and the second output image data IMB2 correspond to the image data IMB in FIG. 1. It is assumed that a display area of the display panel 220 is divided into a first area AR1 and a second area AR2 in a horizontal scanning direction. The first output image data IMB1 is, out of the image data IMB, image data corresponding to the first area AR1, and the second output image data IMB2 is, out of the image data IMB, image data corresponding to the second area AR2. The first display driver 231 drives the first area AR1 of the display panel 220 based on the first output image data IMB1, and the second display driver 232 drives the second area AR2 of the display panel 220 based on the second output image data IMB2. Thus, an image based on the image data IMB is displayed on the display panel 220.

It is assumed that the first area AR1 and the second area AR2 refer to areas put in charge of the display driver and the display panel 220 itself is not divided. Regarding the light source elements arranged in the backlight 210, it is possible to consider separately the light source elements arranged directly below the first area AR1 and the light source elements arranged directly below the second area AR2. However, it is assumed that the backlight 210 itself is not divided into areas. The horizontal scanning direction is also referred to as a left-right direction, and dividing an area in the left-right direction is also referred to as left-right division or the like. The first area AR1 is also referred to as a left area, and the second area AR2 is also referred to as a right area. However, a dividing direction of the area is not limited to the left-right direction and may be an up-down direction, that is, the vertical scanning direction. Further, the number of areas to be divided is not limited to two, and may be three or more.

2. Circuit Device

Hereinafter, illustration and description of the function of the display controller incorporated in the circuit device 100 will not be given, and illustration and description of dimming and color correction will be given.

Figure 3:
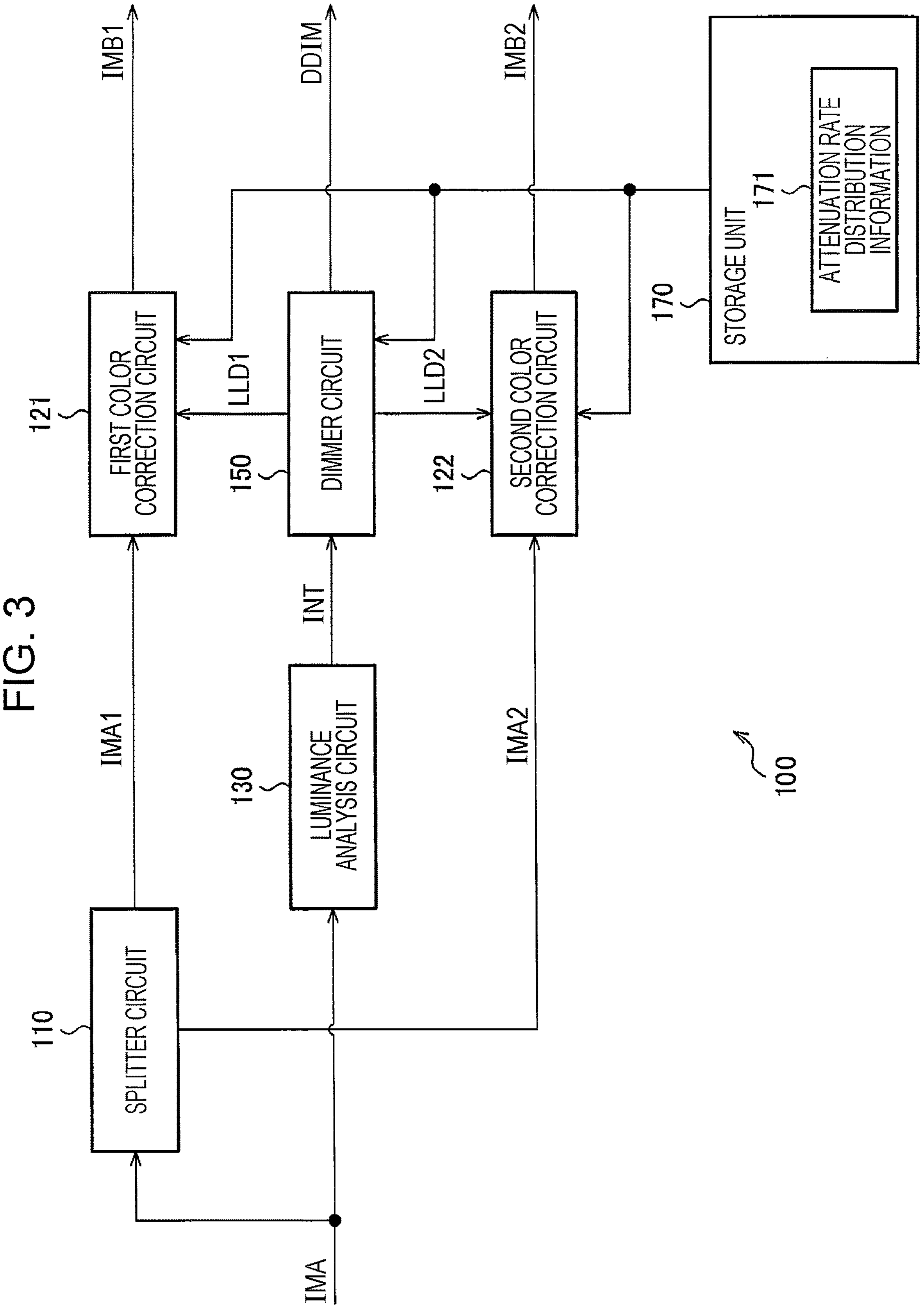
FIG. 3 is a diagram illustrating an example of a configuration of a circuit device.

FIG. 3 illustrates an example of a configuration of the circuit device. The circuit device 100 includes a splitter circuit 110, a first color correction circuit 121, a second color correction circuit 122, a luminance analysis circuit 130, a dimmer circuit 150, and a storage unit 170.

The storage unit 170 stores attenuation rate distribution information 171. The storage unit 170 is a register or a memory. The memory is a volatile memory such as a RAM, or a non-volatile memory such as an OTP memory or an EEPROM. RAM is an abbreviation for Random Access Memory. OTP is an abbreviation for One Time Programmable. EEPROM is an abbreviation for Electrically Erasable Programmable Read Only Memory.

The attenuation rate distribution information 171 indicates an attenuation rate distribution of light reaching the display panel from the light source element. The attenuation rate distribution indicates a relationship between a distance from the light source element to a pixel and an attenuation rate of light with which the light source element illuminates the pixel. The attenuation rate distribution is also referred to as an attenuation characteristic or a luminance distribution. The attenuation rate distribution information 171 is, for example, a lookup table or a function indicating the attenuation rate distribution. When the function is a polynomial, the attenuation rate distribution information 171 may be a coefficient of each term of the polynomial.

The circuit device 100 receives the image data IMA from the processing device 300 through an image interface (not illustrated). An image represented by the image data IMA is referred as an input image. Examples of modes of the image interface may be various modes including an LVDS, a parallel RGB mode, and a display port. LVDS is an abbreviation for Low Voltage Differential Signaling.

Figure 4:
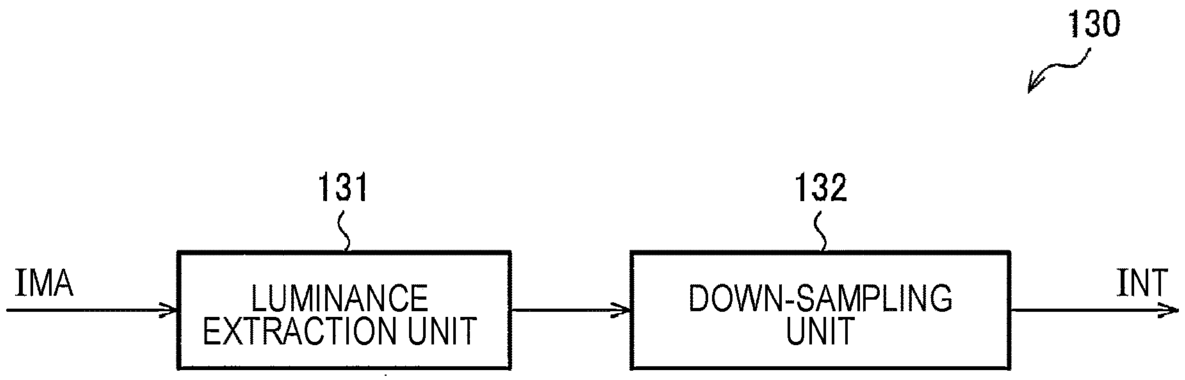
FIG. 4 is a diagram illustrating an example of a detailed configuration of a luminance analysis circuit.

The received image data IMA is input to the luminance analysis circuit 130. In other words, the image data IMA of each frame is input to the luminance analysis circuit 130 without being split into left and right. The luminance analysis circuit 130 analyzes the luminance of the image data IMA and outputs the obtained result as luminance information INT. The luminance information INT indicates luminance of the image at each position of the input image. FIG. 4 illustrates an example of a detailed configuration of the luminance analysis circuit. The luminance analysis circuit 130 includes a luminance extraction unit 131 and a down-sampling unit 132.

The input image is an RGB color image. In other words, each pixel of the image data IMA has an R pixel value, a G pixel value, and a B pixel value. The luminance extraction unit 131 sets the maximum value out of the R pixel value, the G pixel value, and the B pixel value as a luminance value of the corresponding pixel. Thus, a first luminance image is obtained in which each pixel has one luminance value.

The down-sampling unit 132 reduces resolution of the first luminance image to acquire a second luminance image. The number of pixels of the second luminance image is equal to or less than ½ of the number of pixels of the first luminance image. For example, the number of pixels is down-sampled to ½ or less in both the horizontal scanning direction and the vertical scanning direction. In this case, the number of pixels of the second luminance image is ¼ of the number of pixels of the first luminance image. Alternatively, the number of pixels may be down-sampled to ½ in one of the horizontal scanning direction and the vertical scanning direction. In this case, the number of pixels of the second luminance image is ½ of the number of pixels of the first luminance image. The down-sampling unit 132 outputs the second luminance image as luminance information INT. The resolution may be reduced by using various methods, for example, summation average processing, interpolation processing, or filter processing.

The order of the luminance extraction unit 131 and the down-sampling unit 132 may be reversed. In other words, the down-sampling unit 132 may down-sample the image data IMA. Then, the luminance extraction unit 131 may generate a luminance image from the down-sampled image data and output the luminance image as luminance information INT.

The dimmer circuit 150 generates light source luminance information indicating the light-emission luminance of each of the light source elements, based on the luminance information INT, and outputs the light source luminance information as light source luminance data DDIM. Specifically, the dimmer circuit 150 determines the light-emission luminance of each of the light source elements by performing the dimming processing using the luminance information INT and the attenuation rate distribution information 171 stored in the storage 170. Details of such a method will be described below. The dimmer circuit 150 performs the dimming processing on the entire backlight 210 without distinguishing between the first area AR1 and the second area AR2. Then, the dimmer circuit 150 outputs, out of the obtained light source luminance information, first light source luminance information LLD1, which is used for color correction of the first area AR1, to the first color correction circuit 121 and second light source luminance information LLD2, which is used for color correction of the second area AR2, to the second color correction circuit 122. The light source luminance data DDIM contains light source luminance information of the entire backlight 210.

Since light source elements arranged around a pixel are used for color correction, for example, regarding a pixel close to a boundary with the second area AR2 among pixels in the first area AR1, color correction is performed using not only the light-emission luminance of the light source elements arranged in the first area AR1 but also the light-emission luminance of the light source elements arranged in the second area AR2. For this reason, the first light source luminance information LLD1 and the second light source luminance information LLD2 are not completely separated for respective areas, but overlap in the vicinity of the boundary of the areas.

The splitter circuit 110 splits the image data IMA of the input image into first split image data IMA1 corresponding to the first area AR1 and second split image data IMA2 corresponding to the second area AR2. The splitter circuit 110 outputs the first split image data IMA1 to the first color correction circuit 121 and outputs the second split image data IMA2 to the second color correction circuit 122.

The first color correction circuit 121 computes lighting luminance information based on the first light source luminance information LLD1 output from the dimmer circuit 150 and the attenuation rate distribution information 171 stored in the storage unit 170. The lighting luminance information indicates lighting luminance in each pixel on the display panel 220 when the display panel 220 is illuminated by the backlight 210. The computation of the lighting luminance will be described below in detail with reference to FIG. 18. The first color correction circuit 121 performs color correction on the first split image data IMA1 based on the lighting luminance information and outputs the result as the first output image data IMB1. Specifically, the first color correction circuit 121 multiplies pixel data of each pixel in the first area AR1 by a reciprocal number of luminance of light reaching the pixel and sets the obtained result as new pixel data. An image represented by the first output image data IMB1 is referred to as a first output image.

The second color correction circuit 122 computes lighting luminance information based on the second light source luminance information LLD2 output from the dimmer circuit 150 and the attenuation rate distribution information 171 stored in the storage unit 170. The second color correction circuit 122 performs color correction on the second split image data IMA2 based on the lighting luminance information and outputs the result as the second output image data IMB2. Specifically, the second color correction circuit 122 multiplies pixel data of each pixel in the second area AR2 by a reciprocal number of luminance of light reaching the pixel and sets the obtained result as new pixel data. An image represented by the second output image data IMB2 is referred to as a second output image.

Through an interface (not illustrated), the circuit device 100 transmits the first output image data IMB1 to the first display driver 231 and outputs the second output image data IMB2 to the second display driver 232. Examples of modes of the image interface may be various modes including an LVDS, a parallel RGB mode, and a display port.

The splitter circuit 110, the first color correction circuit 121, the second color correction circuit 122, the luminance analysis circuit 130, and the dimmer circuit 150 are logic circuits that process digital signals. Each of the splitter circuit 110, the first color correction circuit 121, the second color correction circuit 122, the luminance analysis circuit 130, and the dimmer circuit 150 may be configured by a separate logic circuit, or some or all of the above circuits may be configured by an integrated logic circuit. Alternatively, a processor such as a DSP may execute an instruction set or a program in which functions of the splitter circuit 110, the first color correction circuit 121, the second color correction circuit 122, the luminance analysis circuit 130, and the dimmer circuit 150 are described, thereby implementing the functions of these circuits. Alternatively, the circuit device 100 may be a processor such as a CPU, a GPU, a microcomputer, a DSP, an ASIC, or an FPGA. Then, the processor may execute an instruction set or a program in which a function of each unit of the circuit device 100 is described, thereby implementing the function of the circuit device 100.

3. Detailed Configuration Example of Circuit Device

Figure 5:
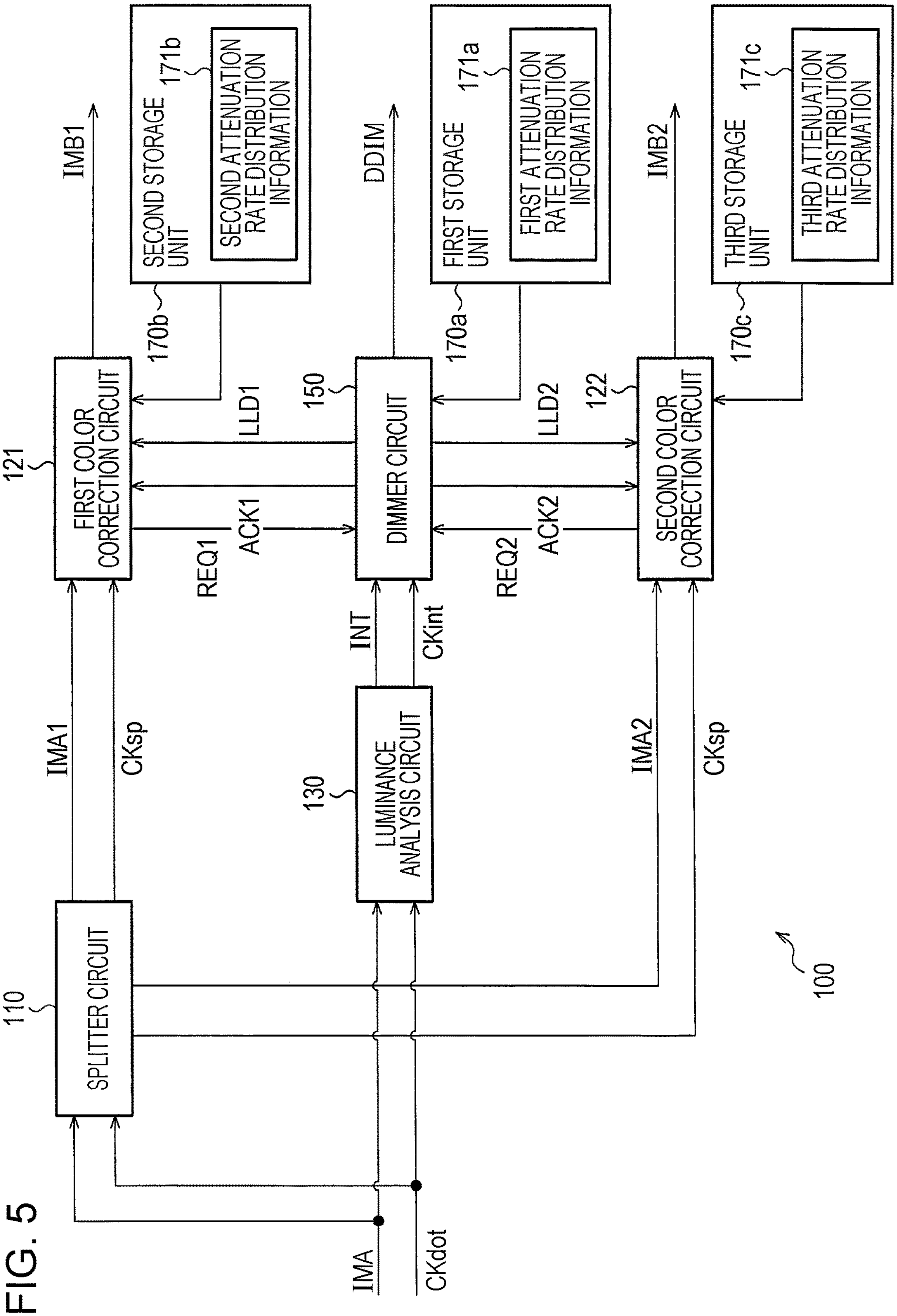
FIG. 5 is a diagram illustrating an example of a detailed configuration of the circuit device.

FIG. 5 illustrates a detailed configuration example of the circuit device. The circuit device 100 includes a splitter circuit 110, a first color correction circuit 121, a second color correction circuit 122, a luminance analysis circuit 130, a dimmer circuit 150, a first storage unit 170*a*, a second storage unit 170*b*, and a third storage unit 170*c*. Differences from FIG. 3 will be mainly described below. A description will be made below with reference to FIGS. 6 to 15.

Each of the first storage unit 170*a*, the second storage unit 170*b*, and the third storage unit 170*c* is an individual memory having an input/output port. The first storage unit 170*a* stores first attenuation rate distribution information 171*a*, the second storage unit 170*b* stores second attenuation rate distribution information 171*b*, and the third storage unit 170*c* stores third attenuation rate distribution information 171*c*. The first attenuation rate distribution information 171*a*, the second attenuation rate distribution information 171*b*, and the third attenuation rate distribution information 171*c* are the same attenuation rate distribution information. In a case where a band for memory access can be ensured, the first storage unit 170*a*, the second storage unit 170*b*, and the third storage unit 170*c* may be used in common as one memory.

A clock signal CKdot, which is a pixel clock signal of the image data IMA, is input to the splitter circuit 110 and the luminance analysis circuit 130. The processing device 300 may transmit the clock signal CKdot to the circuit device 100, or an image interface (not illustrated) of the circuit device 100 may generate a clock signal CKdot synchronizing with the image data IMA.

An operation of the splitter circuit 110 will be described with reference to FIGS. 6 to 9.

Figure 6:
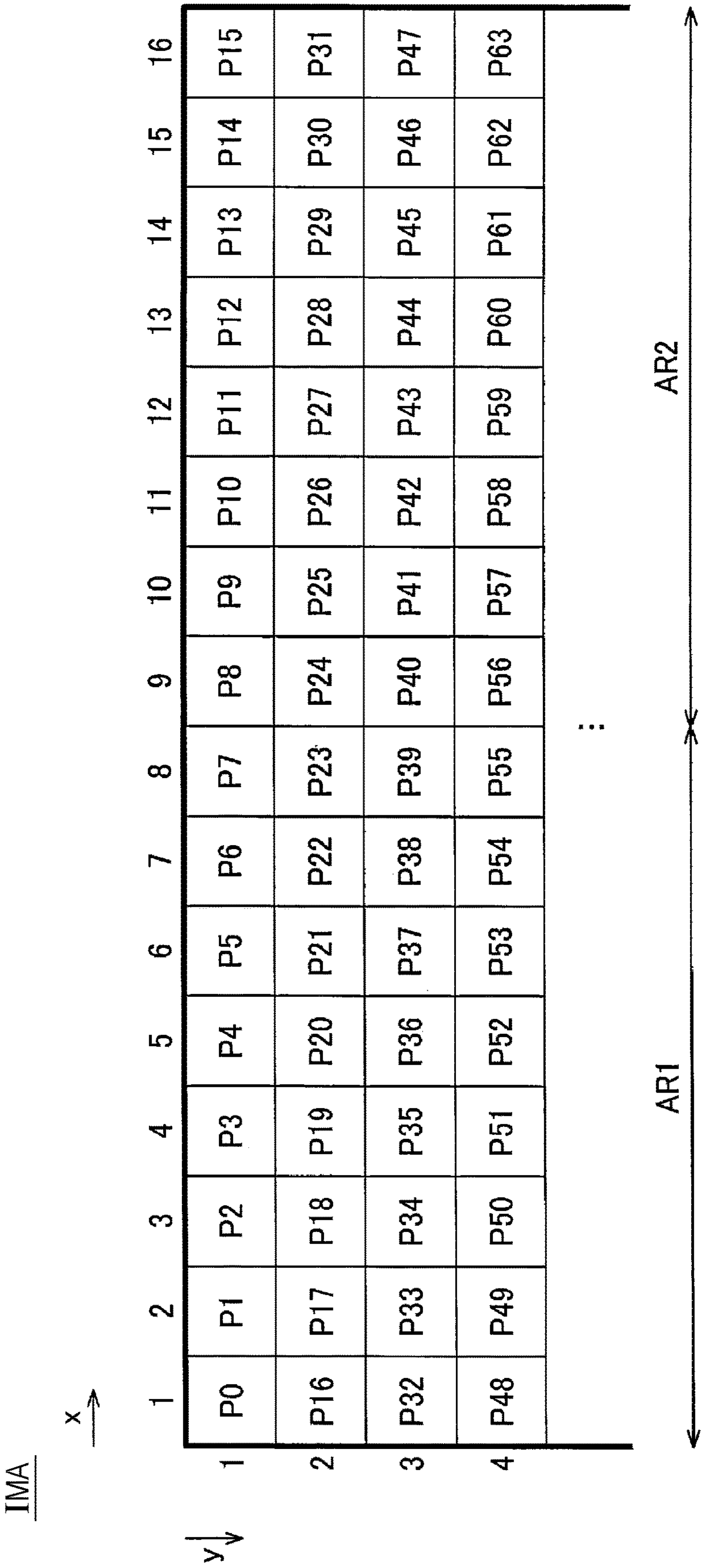
FIG. 6 is a diagram illustrating an example of pixel data of an input image.

FIG. 6 illustrates an example of the pixel data of the input image. Here, it is assumed that the number of pixels of the input image is the same as the number of pixels of the display panel 220, where x indicates a coordinate in the horizontal scanning direction, and y indicates a coordinate in the vertical scanning direction. Each of P0 to P63 represents a pixel or pixel data. FIG. 6 illustrates an example in which the number of pixels in the horizontal scanning direction is 16, where an area of x=1 to 8 is the first area AR1, and an area of x=9 to 16 is the second area AR2.

FIG. 7 illustrates an example of the first split image data. The first split image data IMA1 is image data corresponding to the first area AR1 out of the image data IMA. In other words, pixels of x=1 to 8 in the first split image data IMA1 correspond to the pixels of x=1 to 8 in the image data IMA, respectively.

FIG. 8 illustrates an example of the second split image data. The second split image data IMA2 is image data corresponding to the second area AR2 out of the image data IMA. In other words, pixels of x=1 to 8 in the second split image data IMA2 correspond to the pixels of x=9 to 16 in the image data IMA, respectively.

Figure 9:
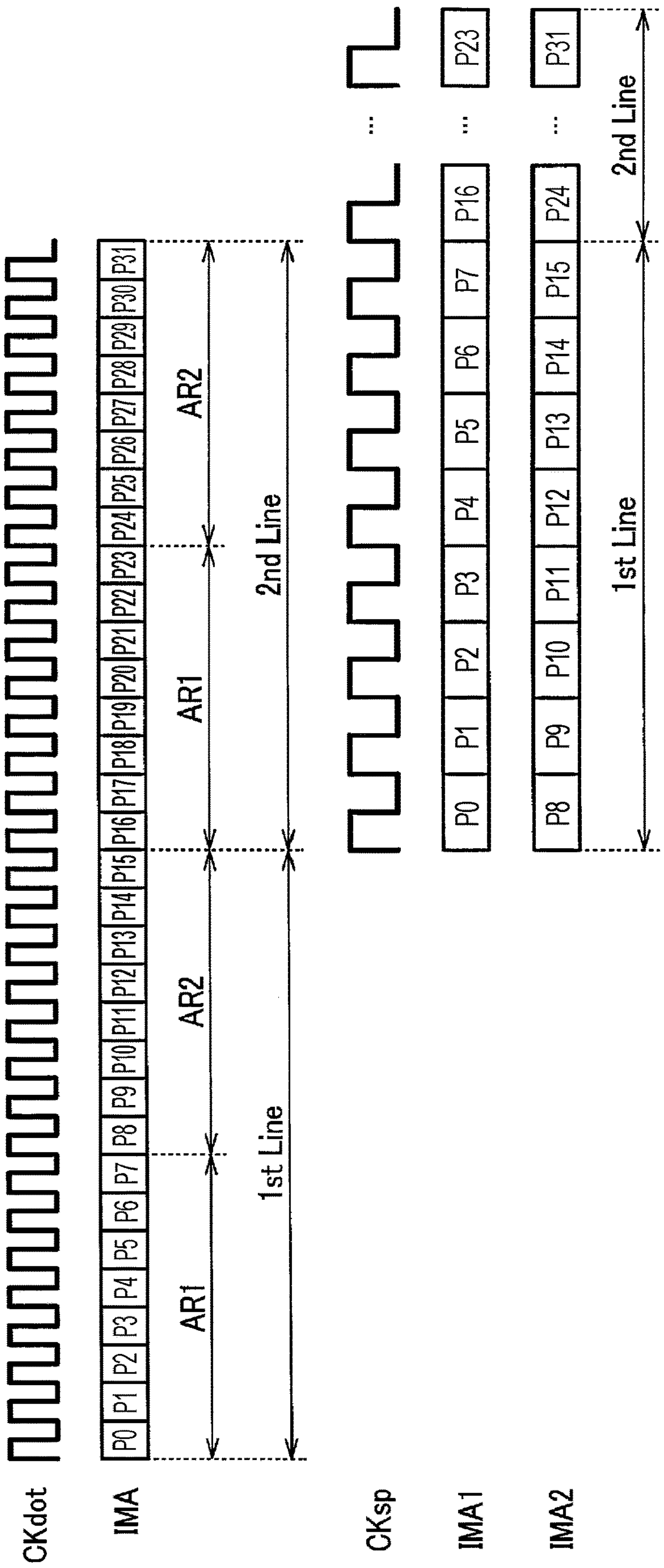
FIG. 9 is a diagram illustrating an example of a signal waveform for describing an operation of a splitter circuit.

FIG. 9 illustrates an example of a signal waveform for describing the operation of the splitter circuit. Stream data of the image data IMA is input to the splitter circuit 110 in synchronization with the clock signal CKdot. The splitter circuit 110 outputs stream data of the first split image data IMA1 and steam data of the second split image data IMA2 in synchronization with a clock signal CKsp. A frequency of the clock signal CKsp is ½ of a frequency of the clock signal CKdot. Specifically, the splitter circuit 110 receives pixel data P0 to P15 of a first line in the image data IMA and then outputs pixel data P0 to P7 of a first line in the first split image data IMA1 and pixel data P8 to P15 of a first line in the second split image data IMA2. The splitter circuit 110 receives pixel data P16 to P31 of a second line in the image data IMA and then outputs pixel data P16 to P23 of a second line in the first split image data IMA1 and pixel data P24 to P31 of a second line in the second split image data IMA2.

An operation of the luminance analysis circuit 130 will be described with reference to FIGS. 10 and 11.

FIG. 10 illustrates an example of pixel data of the luminance information. Each of INT0 to INT15 represents a pixel or pixel data of the luminance information INT. An example is shown herein in which the image data IMA is down-sampled to ½ both vertically and horizontally. Since the number of pixels in the horizontal scanning direction in the image data IMA is 16, the number of pixels in the horizontal scanning direction in the luminance information INT is 8.

For example, when down-sampling is performed by the summation average processing, the pixel data INT0 of the luminance information INT corresponds to the pixel data P0, P1, P16, and P17 of the image data IMA. When the luminance analysis circuit 130 in FIG. 4 is taken as an example, the luminance extraction unit 131 converts each of the pixel data P0, P1, P16, and P17 into a luminance value, and the down-sampling unit 132 summates and averages the four luminance values to obtain the pixel data INT0. The same applies to the pixel data INT1 and subsequent pixels.

Figure 11:
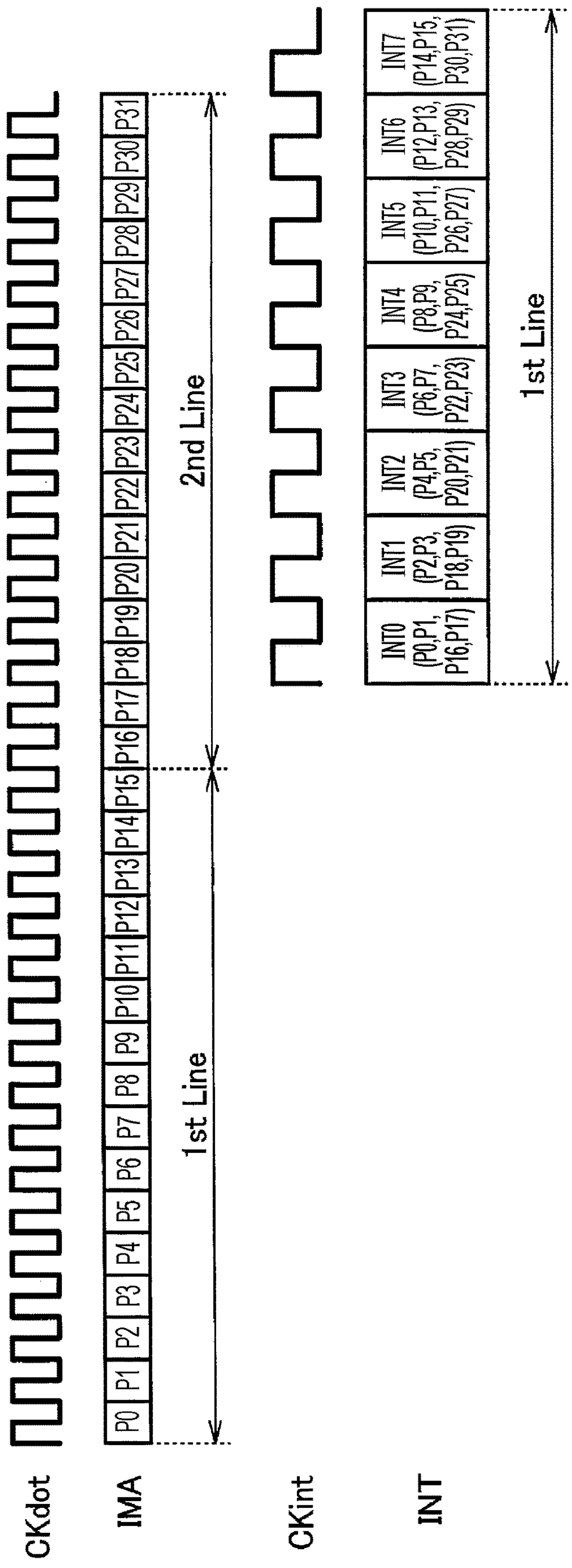
FIG. 11 is a diagram illustrating an example of a signal waveform for describing an operation of the luminance analysis circuit.

FIG. 11 illustrates an example of a signal waveform for describing the operation of the luminance analysis circuit. Stream data of the image data IMA is input to the splitter circuit 110 in synchronization with the clock signal CKdot. The luminance analysis circuit 130 outputs stream data of the luminance information INT in synchronization with a clock signal CKint. A frequency of the clock signal CKint is ½ of the frequency of the clock signal CKdot. However, since the number of pixels is down-sampled to ¼, the frequency of the clock signal CKint may be ¼ of the frequency of the clock signal CKdot. The luminance analysis circuit 130 receives the pixel data P0 to P15 of the first line and the pixel data P16 and P17 in the second line in the image data IMA and then outputs pixel data INT0 to INT7 of a first line in the luminance information INT.

An operation of the dimmer circuit 150 will be described with reference to FIGS. 12 and 13.

Figure 12:
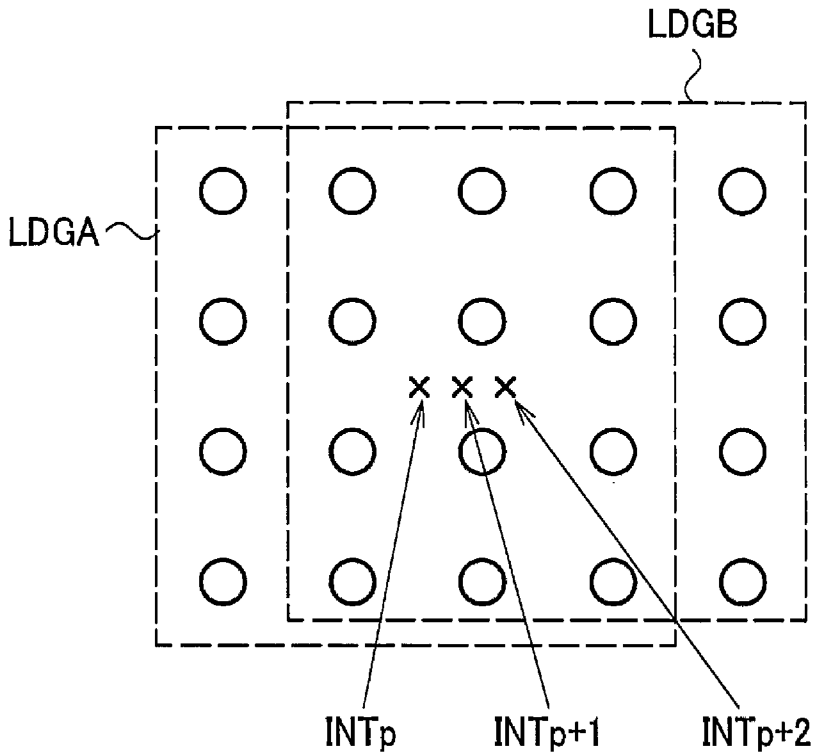
FIG. 12 is a diagram illustrating a correspondence between the luminance information and light source elements.

FIG. 12 is a diagram illustrating the correspondence between the luminance information and the light source elements, where p is any integer equal to or greater than 0. Here, x indicates a position of a pixel on the display panel 220 corresponding to each of pixel data INTp, INTp+1, and INTp+2 of the luminance information INT. A relationship between the pixel position of the luminance information INT and the pixel position of the display panel 220 is clear in consideration of down-sampling. For example, in the case of down-sampling to ½ in the horizontal scanning direction, when pixel coordinates of the luminance information INT in the horizontal scanning direction is made double, the pixel position of the display panel 220 is obtained. The same applies to the vertical scanning direction.

The dimmer circuit 150 selects 2×2 light source elements arranged around the pixel corresponding to the pixel data INTp, and updates light-emission luminance of the 2×2 light source elements based on the pixel data INTp. Similarly, the dimmer circuit 150 selects 2×2 light source elements arranged around the pixels corresponding to the pixel data INTp+1 and INTp+2, and updates light-emission luminance of the 2×2 light source elements based on the pixel data INTp+1 and INTp+2. Regarding INTp and INTp+1, the same 2×2 light source elements are selected. These light source elements are referred to as a light source element group LDGA. Regarding INTp+2, the surrounding 2×2 light source elements are shifted by one column in the horizontal scanning direction. These light source elements are referred to as a light source element group LDGB.

Figure 13:
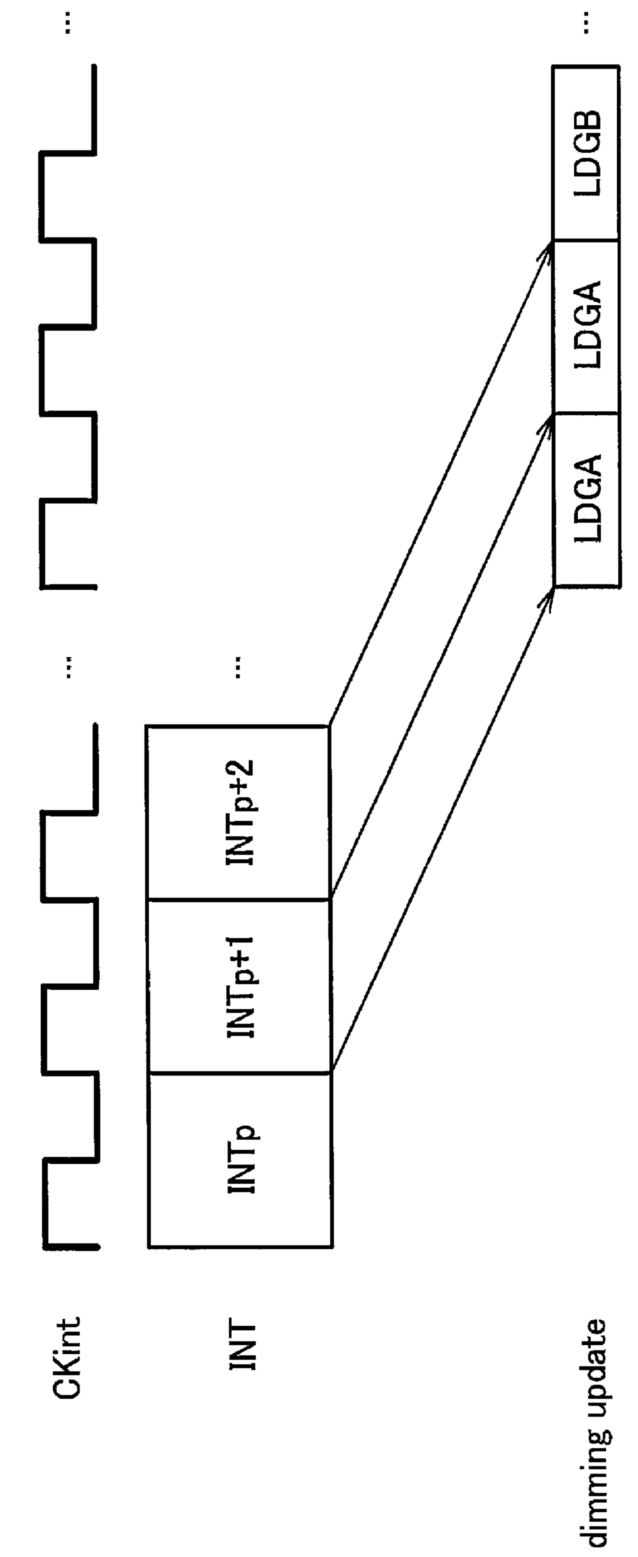
FIG. 13 is a diagram illustrating an example of a signal waveform for describing an operation of a dimmer circuit.

FIG. 13 illustrates an example of a signal waveform for describing the operation of the dimmer circuit. The stream data of the luminance information INT is input to the dimmer circuit 150 in synchronization with the clock signal CKint. The dimmer circuit 150 receives the pixel data INTp and then updates, based on the pixel data INTp, the light-emission luminance of each of the light source elements belonging to the light source element group LDGA. The dimmer circuit 150 receives the pixel data INTp+1 and then updates, based on the pixel data INTp+1, the light-emission luminance of each of the light source elements belonging to the light source element group LDGA. The dimmer circuit 150 receives the pixel data INTp+2 and then updates, based on the pixel data INTp+2, the light-emission luminance of each of the light source elements belonging to the light source element group LDGB.

Operations of the first color correction circuit 121 and the second color correction circuit 122 will be described with reference to FIGS. 14 and 15.

Figure 14:
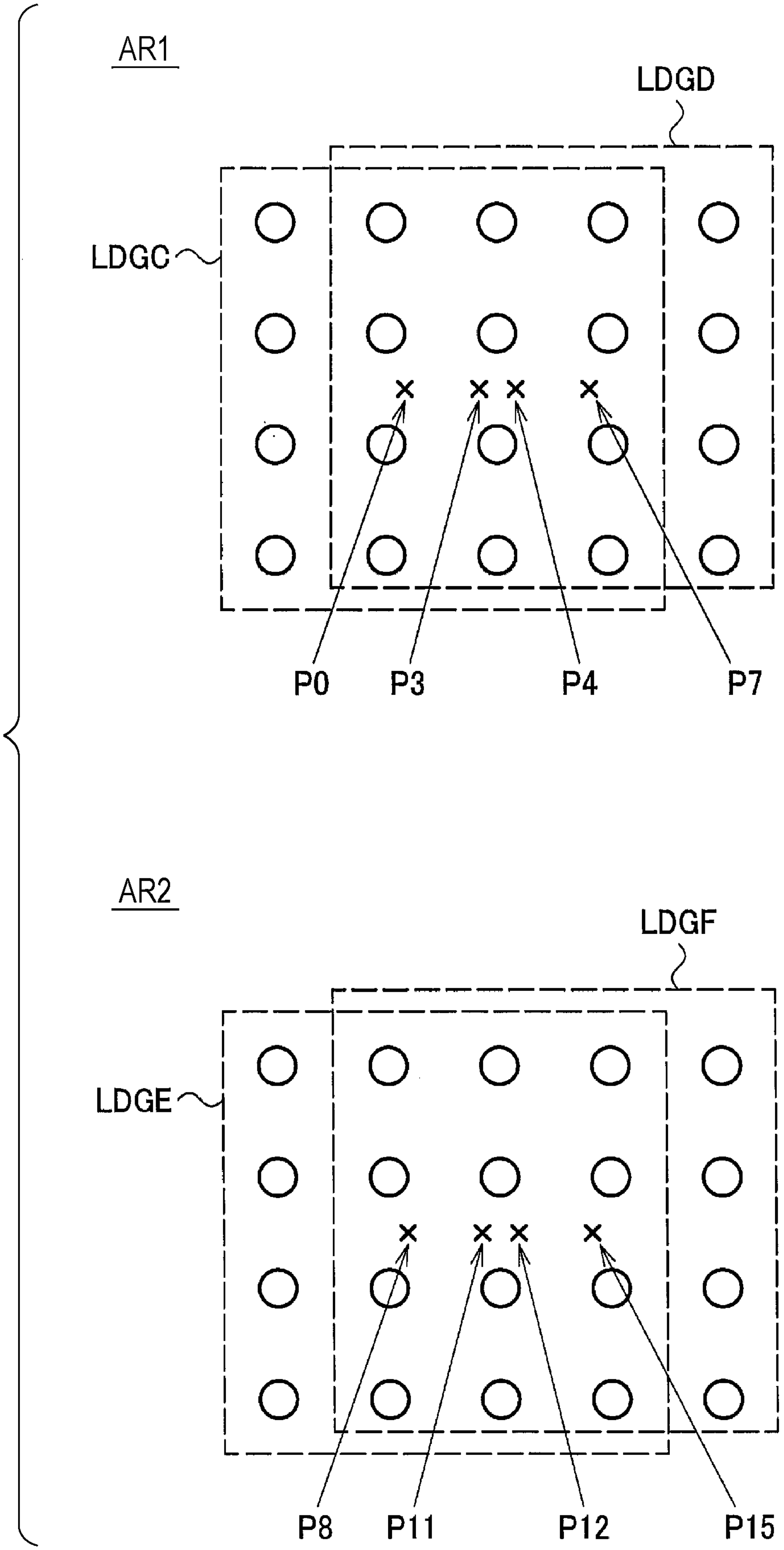
FIG. 14 is a diagram illustrating a correspondence between the first split image data and the light source elements and a correspondence between the second split image data and the light source elements.

An upper part in FIG. 14 is a diagram illustrating the correspondence between the first split image data and the light source elements. A lower part in FIG. 14 is a diagram illustrating the correspondence between the second split image data and the light source elements. Here, x indicates a position of a pixel on the display panel 220 corresponding to each of pixel data P0, P3, P4 and P7 of the first split image data IMA1 and each of pixel data P8, P11, P12 and P15 of the second split image data IMA2. Positions of some pixels are not illustrated.

The first color correction circuit 121 selects 2×2 light source elements arranged around the pixel corresponding to the pixel data P0 and performs color correction on the pixel data P0 based on the light-emission luminance of the 2×2 light source elements. Similarly, the first color correction circuit 121 selects 2×2 light source elements arranged around the pixels corresponding to the pixel data P1 to P7 and performs color correction on the pixel data P1 to P7 based on the light-emission luminance of the 2×2 light source elements. Regarding P0 to P3, the same 2×2 light source elements are selected. These light source elements are referred to as a light source element group LDGC. Regarding P4 to P7, the surrounding 2×2 light source elements are shifted by one column in the horizontal scanning direction. These light source elements are referred to as a light source element group LDGD.

The second color correction circuit 122 selects 2×2 light source elements arranged around the pixel corresponding to the pixel data P8 and performs color correction on the pixel data P8 based on the light-emission luminance of the 2×2 light source elements. Similarly, the second color correction circuit 122 selects 2×2 light source elements arranged around the pixels corresponding to the pixel data P9 to P15 and performs color correction on the pixel data P9 to P15 based on the light-emission luminance of the 2×2 light source elements. Regarding P8 to P11, the same 2×2 light source elements are selected. These light source elements are referred to as a light source element group LDGE. Regarding P12 to P15, the surrounding 2×2 light source elements are shifted by one column in the horizontal scanning direction. These light source elements are referred to as a light source element group LDGF.

As described above, the light source elements of the backlight 210 are not completely divided into AR1 and AR2. In FIG. 14, for example, the light source element group LDGE in the lower part is shifted by one column in the horizontal scanning direction from the light source element group LDGD in the upper part. In other words, the light source element groups LDGD and LDGE overlap each other by three columns.

Figure 15:
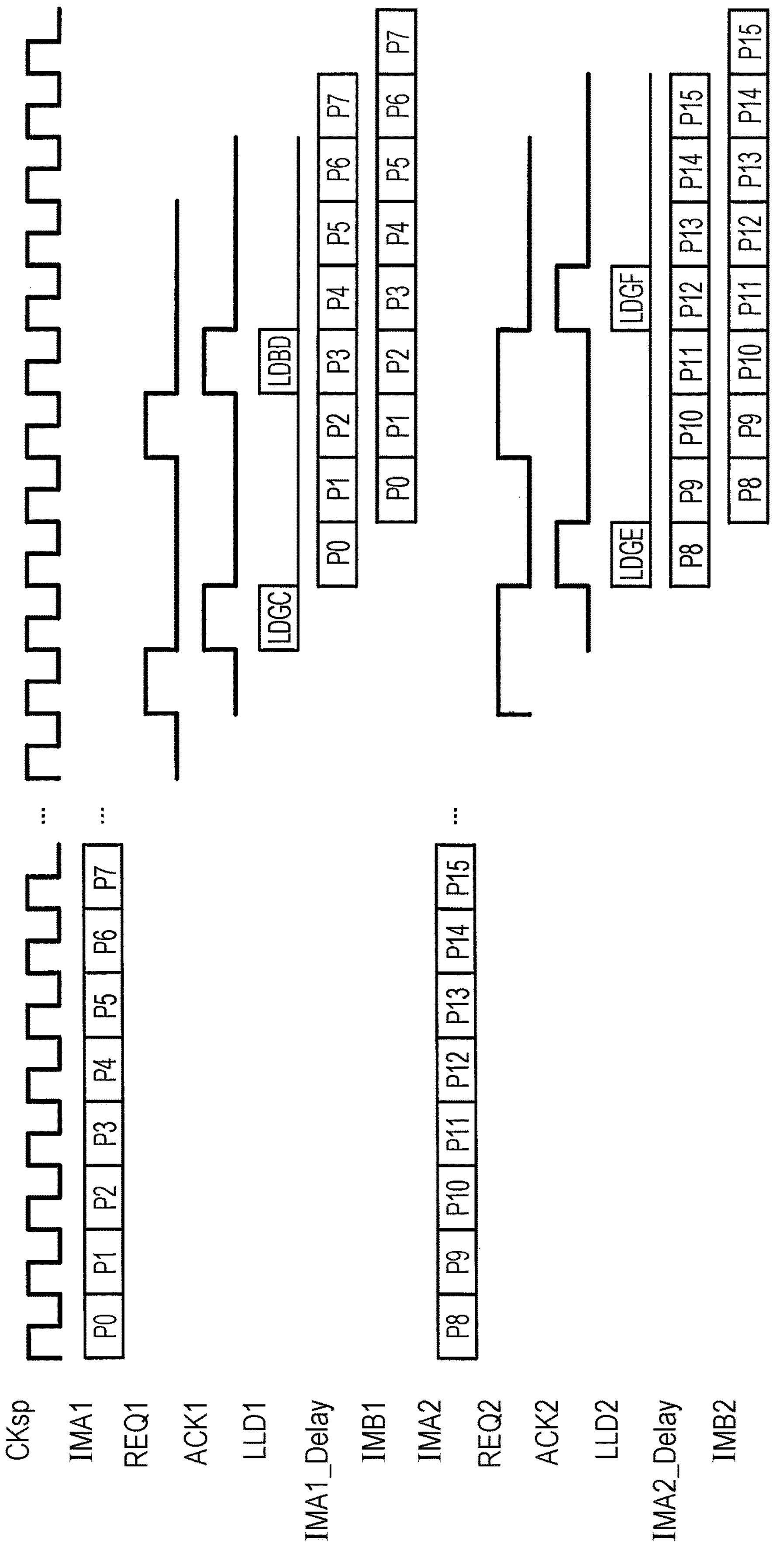
FIG. 15 is a diagram illustrating an example of a signal waveform for describing an operation of a first color correction circuit and an operation of a second color correction circuit.

FIG. 15 illustrates an example of a signal waveform for describing the operation of the first color correction circuit and the operation of the second color correction circuit. The stream data of the first split image data IMA1 is input to the first color correction circuit 121 in synchronization with the clock signal CKsp. The first color correction circuit 121 performs color correction on image data IMA1_Delay obtained by buffering the first split image data IMA1. For example, since the light-emission luminance of the light source element group LDGC is required for the color correction of the pixel data P0, the first color correction circuit 121 needs to wait until the dimmer circuit 150 determines the light-emission luminance of the light source element group LDGC. Such a waiting time is a buffering time. The first color correction circuit 121 activates a first request signal REQ1 for the dimmer circuit 150. The dimmer circuit 150 activates a first acknowledge signal ACK1 in response to the first request signal REQ1 and transmits data indicating the light-emission luminance of each of the light source elements of the light source element group LDGC to the first color correction circuit 121. The first color correction circuit 121 performs color correction on pixel data P0 to P3 in the image data IMA1_Delay by using the light-emission luminance of each of the light source elements of the light source element group LDGC and outputs pixel data P0 to P3 in the first output image data IMB1. Similarly, the first color correction circuit 121 performs color correction on pixel data P4 to P7 in the image data IMA1_Delay by using the light-emission luminance of each of the light source elements of the light source element group LDGD and outputs pixel data P4 to P7 in the first output image data IMB1.

The stream data of the second split image data IMA2 is input to the second color correction circuit 122 in synchronization with the clock signal CKsp. The second color correction circuit 122 performs color correction on image data IMA2_Delay obtained by buffering the second split image data IMA2. The second color correction circuit 122 activates a second request signal REQ2 for the dimmer circuit 150. The dimmer circuit 150 activates a second acknowledge signal ACK2 in response to the second request signal REQ2 and transmits data indicating the light-emission luminance of each of the light source elements of the light source element group LDGE to the second color correction circuit 122. When the first request signal REQ1 and the second request signal REQ2 become active at the same time, the dimmer circuit 150 responds to the first request signal REQ1 and responds to the second request signal REQ2 with a delay of one clock. The second color correction circuit 122 performs color correction on pixel data P8 to P11 in the image data IMA2_Delay by using the light-emission luminance of each of the light source elements of the light source element group LDGE and outputs pixel data P8 to P11 in the second output image data IMB2. Similarly, the second color correction circuit 122 performs color correction on pixel data P12 to P15 in the image data IMA2_Delay by using the light-emission luminance of each of the light source elements of the light source element group LDGF and outputs pixel data P12 to P15 in the second output image data IMB2.

The dimmer circuit 150 includes a buffer memory that temporarily stores the light source luminance information. The buffer memory receives the first request signal REQ1 from the first color correction circuit 121 and returns the first acknowledge signal ACK1 and the data of the light source luminance information to the first color correction circuit 121. In addition, the buffer memory receives the second request signal REQ2 from the second color correction circuit 122 and returns the second acknowledge signal ACK2 and the data of the light source luminance information to the second color correction circuit 122. Further, when the first request signal REQ1 and the second request signal REQ2 become active at the same time, the buffer memory arbitrates return timing of the acknowledge signal or the like.

In the present embodiment described above, the circuit device 100 controls the display device 200 including the light source elements and the display panel 220. The circuit device 100 includes the luminance analysis circuit 130, the dimmer circuit 150, the first color correction circuit 121, and the second color correction circuit 122. The luminance analysis circuit 130 performs luminance analysis and resolution reduction on the image data IMA of the input image to output the luminance information INT having resolution lower than that of the input image. The dimmer circuit 150 determines, according to the luminance information INT, the light source luminance information indicating the light-emission luminance at which each of the light source elements emits light. The first color correction circuit 121 performs the color correction on the first split image data IMA1 corresponding to the first area AR1 of the display panel 220 out of the image data IMA, based on the light source luminance information. The second color correction circuit 122 performs the color correction on the second split image data IMA2 corresponding to the second area AR2 of the display panel 220 out of the image data IMA, based on the light source luminance information.

According to the present embodiment, the first color correction circuit 121 performs the color correction on the first split image data IMA1, and the second color correction circuit 122 performs the color correction on the second split image data IMA2, whereby the processing speed of the color correction can be halved as compared with a case where one color correction circuit performs the color correction on the image data IMA. Further, the dimmer circuit 150 performs the dimming based on the luminance information INT having the resolution lower than that of the input image, whereby the processing speed can be lowered and the dimming can be performed without division of the area.

As described above, the light-emission luminance of the light source elements around each pixel is determined from the luminance information of the pixel, and thus the division of the area is difficult in the dimming. In this regard, according to the present embodiment, it is possible to reduce the speed of the dimming processing without dividing the area by lowering the resolution of the luminance information INT. On the other hand, regarding the color correction, two color correction circuits are provided, and thus it is possible to perform the color correction while maintaining the resolution of the original image data IMA. Thereby, it is possible to perform the color correction while maintaining image quality. As described above, according to the present embodiment, it is possible to lower appropriately the processing speed for each of the dimming processing and the color correction in the local dimming.

In the present embodiment, the dimmer circuit 150 may alternately perform the output of the light source luminance information to the first color correction circuit 121 and the output of the light source luminance information to the second color correction circuit 122. In FIGS. 14 and 15, for example, the dimmer circuit 150 outputs the light source luminance information of the light source element group LDGC to the first color correction circuit 121 and then outputs the light source luminance information of the light source element group LDGE to the second color correction circuit 122. Next, the dimmer circuit 150 outputs the light source luminance information of the light source element group LDGD to the first color correction circuit 121 and then outputs the light source luminance information of the light source element group LDGF to the second color correction circuit 122.

The first color correction circuit 121 and the second color correction circuit 122 perform the color correction in parallel and request the light source luminance information to the dimmer circuit 150. According to the present embodiment, the dimmer circuit 150 alternately returns the light source luminance information to the first color correction circuit 121 and the second color correction circuit 122 in response to the requests, and thus the first color correction circuit 121 and the second color correction circuit 122 can execute the color correction in parallel by using the light source luminance information. As illustrated in FIGS. 14 and 15, since the number of light source elements is smaller than the number of pixels, each of the color correction circuits requests the light source luminance information only once in a plurality of clocks. Therefore, the dimmer circuit 150 can alternately return the light source luminance information to the first color correction circuit 121 and the second color correction circuit 122.

In the present embodiment, the dimmer circuit 150 may output the light source luminance information to be used by the first color correction circuit 121 in response to the first request signal REQ1 from the first color correction circuit 121. The dimmer circuit 150 may output the light source luminance information to be used by the second color correction circuit 122 in response to the second request signal REQ2 from the second color correction circuit 122.

According to the present embodiment, the first color correction circuit 121 can perform the color correction on the first split image data IMA1 by using the light source luminance information returned in response to the first request signal REQ1. Further, the second color correction circuit 122 can perform the color correction on the second split image data IMA2 by using the light source luminance information returned in response to the second request signal REQ2.

In the present embodiment, an arrangement interval of the light source elements in the horizontal scanning direction may be two or more pixels of the display panel 220. The arrangement interval of the light source elements in the horizontal scanning direction is four pixels in FIGS. 14 and 15, but may be two or more pixels.

According to the present embodiment, since the arrangement interval of the light source elements in the horizontal scanning direction is two or more pixels of the display panel 220, an interval at which one color correction circuit activates the request signal is two or more clocks. Thus, the dimmer circuit 150 can alternately perform the output of the light source luminance information to the first color correction circuit 121 and the output of the light source luminance information to the second color correction circuit 122.

In the present embodiment, the circuit device 100 may include the splitter circuit 110. The splitter circuit 110 may receive the image data IMA, output the first split image data IMA1 to the first color correction circuit 121, and output the second split image data IMA2 to the second color correction circuit 122.

According to the present embodiment, the first color correction circuit 121 can perform the color correction on the first split image data IMA1 corresponding to the first area AR1 of the display panel 220, and the second color correction circuit 122 can perform the color correction on the second split image data IMA2 corresponding to the second area AR2 of the display panel 220.

In the present embodiment, the circuit device 100 may include the first storage unit 170*a*. The first storage unit 170*a* may store the first attenuation rate distribution information 171*a* indicating the attenuation rate distribution of light with respect to the distance between the light source element and the pixel when the light source element illuminates the pixel. The dimmer circuit 150 may read the first attenuation rate distribution information 171*a* from the first storage unit 170*a* and determine the light source luminance information based on the first attenuation rate distribution information 171*a* and the luminance information INT.

The color correction is separated into passes of the first area AR1 and the second area AR2, but the dimming is not separated into passes. Therefore, the storage unit from which the dimmer circuit 150 reads the attenuation rate distribution information may be the single first storage unit 170*a*.

In the present embodiment, the circuit device 100 may include the second storage unit 170*b* that stores the second attenuation rate distribution information 171*b* indicating the attenuation rate distribution and the third storage unit 170*c* that stores the third attenuation rate distribution information 171*c* indicating the attenuation rate distribution. The first color correction circuit 121 may read the second attenuation rate distribution information 171*b* from the second storage unit 170*b* and perform the color correction on the first split image data IMA1 based on the second attenuation rate distribution information 171*b* and the light source luminance information. The second color correction circuit 122 may read the third attenuation rate distribution information 171*c* from the third storage unit 170*c* and perform the color correction on the second split image data IMA2 based on the third attenuation rate distribution information 171*c* and the light source luminance information.

Each of the dimmer circuit 150, the first color correction circuit 121, and the second color correction circuit 122 acquires the attenuation rate corresponding to the distance between the pixel and the light source element by referring to the attenuation rate distribution information in the storage unit. At this time, since the distances referred to by the dimmer circuit 150, the first color correction circuit 121, and the second color correction circuit 122 are different from each other, reference addresses of the storage units are different from each other. According to the present embodiment, since one storage unit is provided for each of the circuits, each of the circuits can independently access the storage unit. The storage unit may be used in common for the dimmer circuit 150, the first color correction circuit 121, and the second color correction circuit 122. For example, as the attenuation rate distribution information 171, a lookup table may be used in which an attenuation rate is associated with a discrete distance. In this case, regarding a distance between a certain distance and the next distance, attenuation rates corresponding to the certain distance and the next distance are read from a lookup table, and the attenuation rate for the distance is calculated by interpolation processing. For this reason, it is sufficient to perform interpolation processing from the same two distances until the distance exceeds the range between a certain distance and the next distance, and thus it is not necessary to newly refer to the lookup table. This means that the circuits may access the lookup table once for a plurality of pixels. Since each of the dimmer circuit 150, the first color correction circuit 121, and the second color correction circuit 122 may access the lookup table once for the plurality of pixels, the storage unit may be used in common for the dimmer circuit 150, the first color correction circuit 121, and the second color correction circuit 122.

In the present embodiment, the number of pixels of the luminance information INT is a half or less the number of pixels of the image data IMA.

Thus, each of the processing speed of the first color correction circuit 121 and the processing speed of the second color correction circuit 122 is reduced to half of the original speed by the division of the image. Since the number of pixels of the luminance information INT is a half or less the number of pixels of the image data IMA, the processing speed of the dimmer circuit 150 is a half or less that in a case where luminance information having the same number of pixels as the image data IMA is used. Thus, even when the dimming is performed without the division of the area, the processing speed of the dimming can be made equal to or lower than the processing speed of the color correction.

4. Dimmer Circuit and Color Correction Circuit

Figure 16:
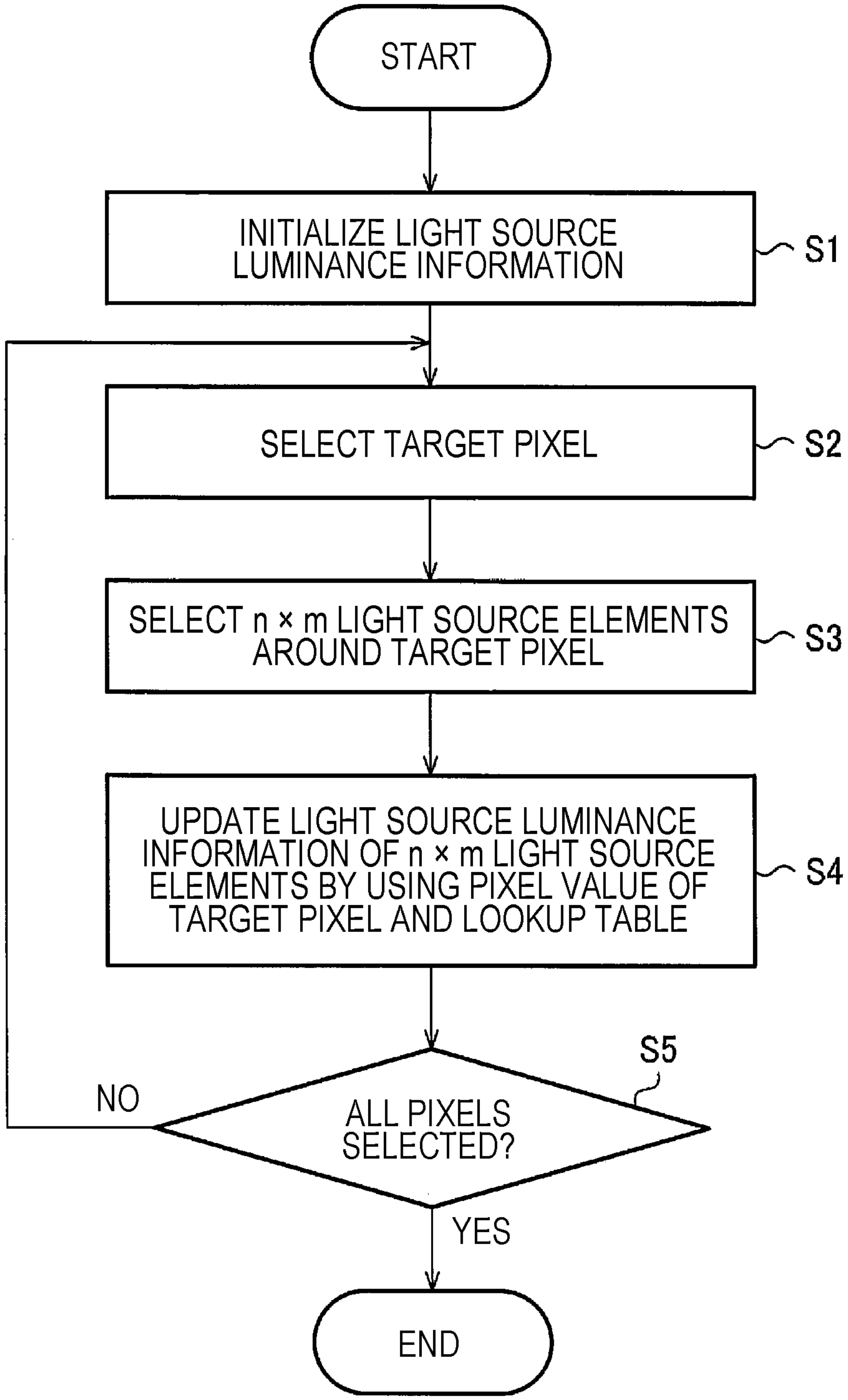
FIG. 16 is a flowchart of processing performed by a dimmer circuit.
Figure 17:
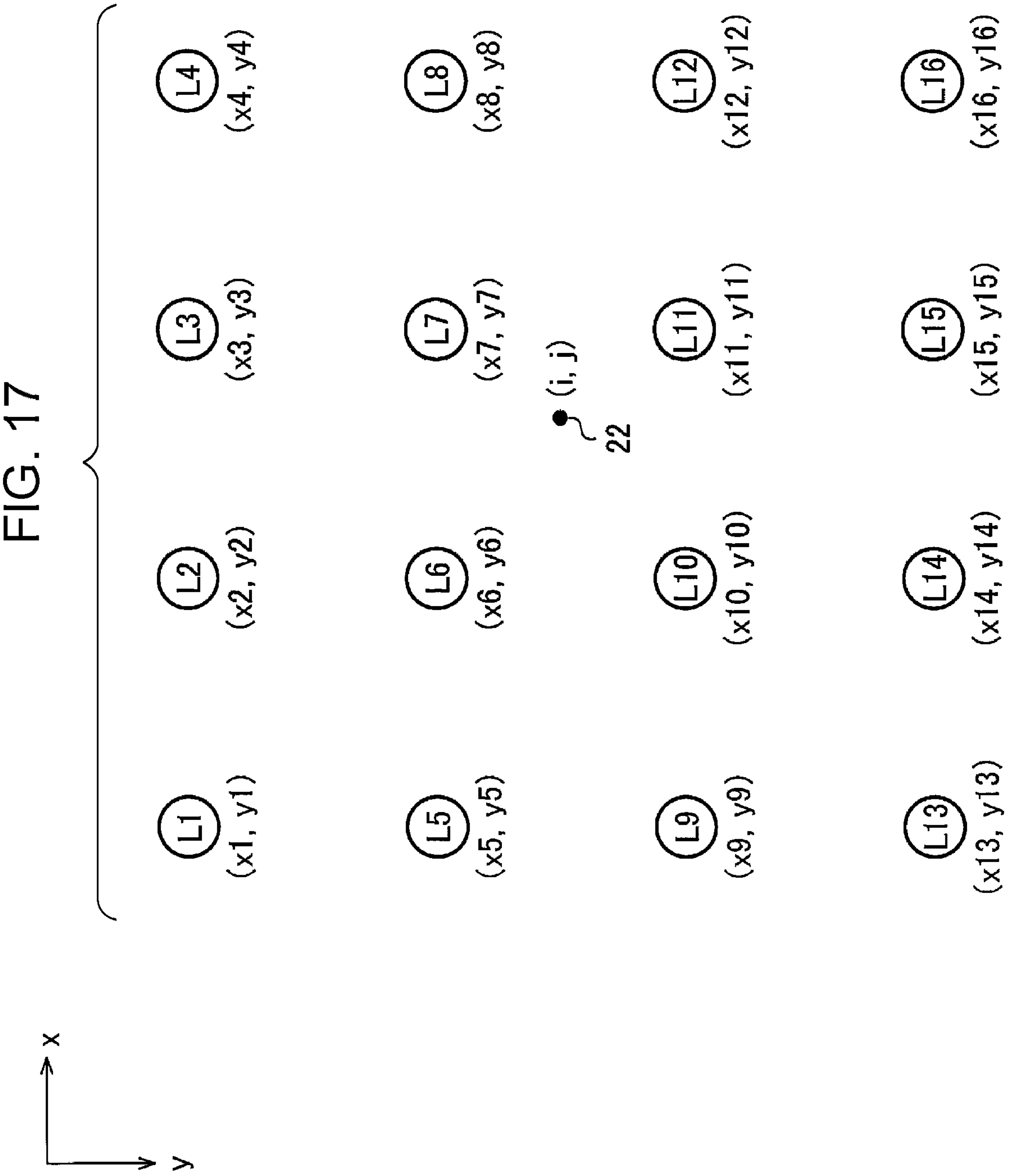
FIG. 17 is a diagram illustrating an example of surrounding light source elements.

FIG. 16 is a flowchart of processing performed by the dimmer circuit. In the following description, an example of surrounding light source elements illustrated in FIG. 17 is used. In FIG. 17, an x-direction is a horizontal scanning direction of the display panel, and a y-direction is a vertical scanning direction of the display panel. Here, (x, y) indicates coordinates of a pixel on the display panel and is associated with coordinates of a pixel in the luminance information INT in consideration of down-sampling.

In step S1, the dimmer circuit 150 initializes the light source luminance information. For example, the luminance value of each of the light source elements is initialized to zero.

In step S2, the dimmer circuit 150 selects one pixel from the pixels in the luminance information INT. The selected pixel is referred to as a target pixel. Further, a pixel on the display panel corresponding to the target pixel of the luminance information INT is also referred to as a target pixel. Through a loop from step S2 to step S5, target pixels in the luminance information INT are sequentially selected. For example, a process is performed in which a first pixel of a first scanning line of the luminance information INT is selected in the first round of step S2, a second pixel, a third pixel, and the like are sequentially selected in the next and following rounds of step S2, and pixels of a second scanning line are sequentially selected when all the pixels of the first scanning line are selected, and such a process is repeated up to a final scanning line.

In step S3, the dimmer circuit 150 selects n×m light source elements around the target pixel on the display panel. The n×m light source elements are also referred to as surrounding light source elements, where each of n and m may be an integer of 2 or more.

As illustrated in FIG. 17, a position of a target pixel 22 on the display panel is set to (i, j), where i and j are integers, and the position (i, j) indicates an i-th pixel of a j-th scanning line. In the example of FIG. 17, n=m=4. The dimmer circuit 150 selects light source elements L1 to L16 in the nearest two columns in each of a +x-direction and a −x-direction and in the nearest two rows in each of the +y-direction and the −y-direction with respect to the position (i, j). When k is an integer of 1 or more and 16 or less, a position of a light source element Lk is represented as (xk, yk).

In step S4 of FIG. 16, using the pixel value of the target pixel in the luminance information INT and the attenuation rate distribution information 171 stored in the storage unit 170, the light source luminance information is updated for each of the n×m light source elements selected in step S3.

In step S5, the dimmer circuit 150 determines whether all of the pixels have been selected as the target pixels, the process ends when all of the pixels have been selected, and the process returns to step S2 when there is any pixel that has not been selected.

A description will be made with respect to update processing of the light source luminance information in step S4. The dimmer circuit 150 obtains, from Formula (1) below, a required variation amount $\Delta_{ij}$ indicating a variation amount required for the amount of light received by the target pixel 22 on the display panel from the light source elements L1 to L16.

$$\Delta_{ij} = INT_{ij} - \sum_{k=1}^{16} lsf(k) \times powc(k) \tag{1}$$

In Formula (1) above, $INT_{ij}$ indicates the luminance value of the target pixel in the luminance information INT, where lsf(k) indicates an attenuation rate of light with which the light source element Lk illuminates the target pixel 22 on the display panel and is obtained from an actual attenuation rate distribution or an attenuation rate distribution approximating the actual attenuation rate distribution. The dimmer circuit 150 obtains the lsf(k) by using the attenuation rate distribution information 171. The attenuation rate distribution information 171 is a lookup table or a function. In Formula (1), powc(k) indicates previous light source luminance information of the light source element Lk. The previous light source luminance information is light source luminance information calculated by using a previous target pixel selected immediately before the current target pixel in the luminance information INT. The previous target pixel is a pixel immediately before the current target pixel in the x-direction in the luminance information INT.

The dimmer circuit 150 updates the light source luminance information by distributing the required variation amount $\Delta_{ij}$ to the light source luminance information of the light source element Lk by using Formula (2) below.

$$powu(k) = \begin{cases} powc(k) + \Delta_{ij} \dfrac{lsf(k)}{\sum_{\alpha=1}^{16} lsf(\alpha)}, & \text{if } \Delta_{ij} > 0 \\ powc(k), & \text{if } \Delta_{ij} \leq 0 \end{cases} \tag{2}$$

In Formula (2) above, powu(k) indicates the current light source luminance information, that is, the light source luminance information after being updated.

Figure 18:
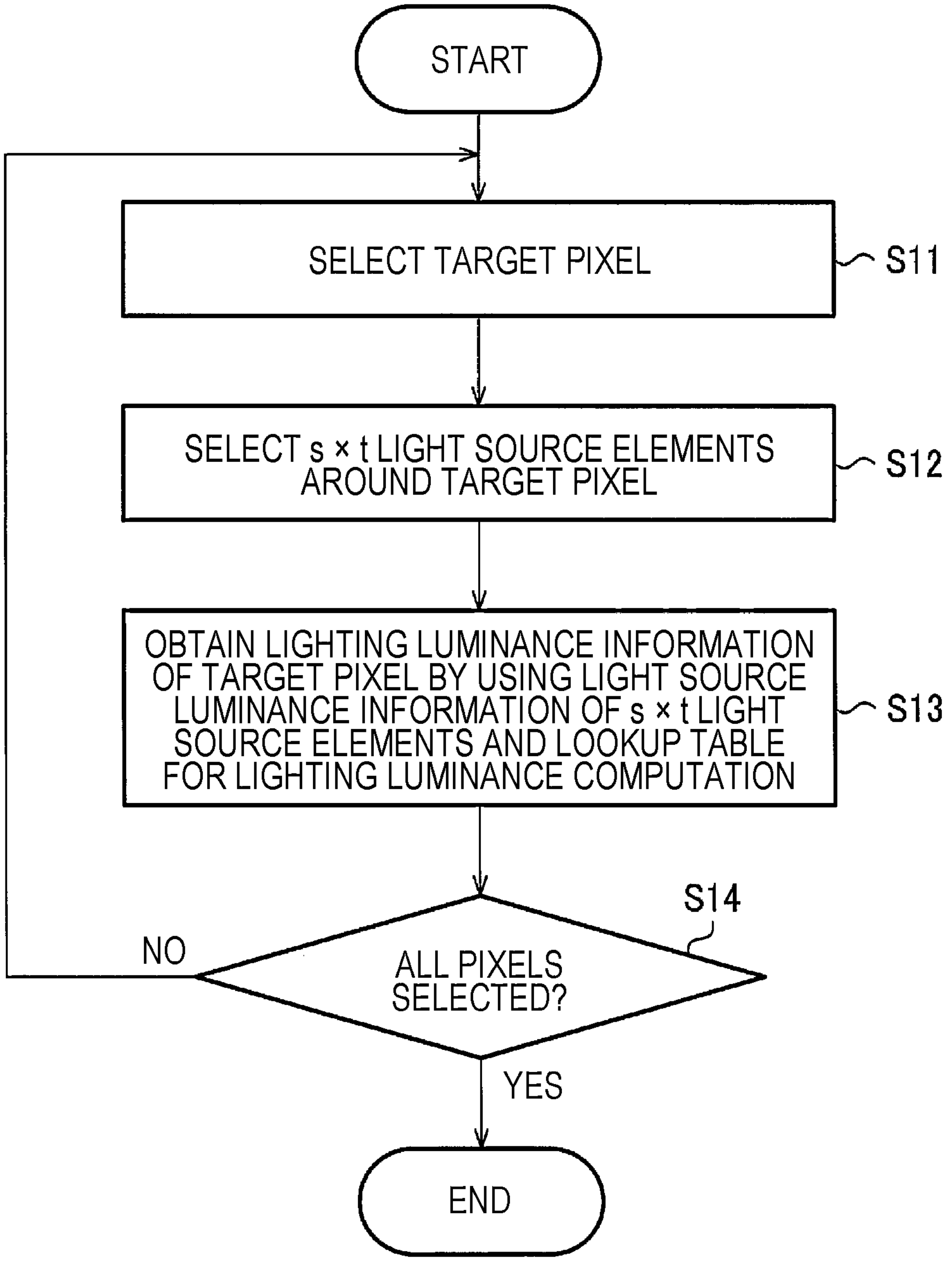
FIG. 18 is a flowchart of lighting luminance computation processing performed by the first color correction circuit.

FIG. 18 is a flowchart of lighting luminance computation processing performed by the first color correction circuit. The lighting luminance computation processing performed by the first color correction circuit 121 will be described herein as an example, but the same applies to the second color correction circuit 122. The example of the surrounding light source elements in FIG. 17 is used herein, but the processing performed by the first color correction circuit 121 is processing different from the processing performed by the dimmer circuit 150. Since it is not necessary to consider the down-sampling in the color correction, the position (i, j) of the target pixel 22 can be considered to be the same as the position of the pixel of the image data IMA.

In step S11, the first color correction circuit 121 selects one pixel from the pixels in the first split image data IMA1. The selected pixel is referred to as a target pixel. Through a loop from step S11 to step S14, target pixels are sequentially selected. For example, a process is performed in which a first pixel of a first scanning line of the first split image data IMA1 is selected in the first round of step S11, a second pixel, a third pixel, and the like are sequentially selected in the next and the following rounds of step S11, and pixels of a second scanning line are sequentially selected when all the pixels of the first scanning line are selected, and such a process is repeated up to a final scanning line.

In step S12, the first color correction circuit 121 selects s×t light source elements around the target pixel. The s×t light source elements are also referred to as surrounding light source elements, where each of s and t may be an integer of 2 or more. FIG. 17 illustrates an example of s=t=4.

The position of the target pixel 22 is set to (i, j), where i and j are integers, and the position (i, j) indicates an i-th pixel of a j-th scanning line. The first color correction circuit 121 selects light source elements L1 to L16 in the nearest two columns in each of the +x-direction and the −x-direction and in the nearest two rows in each of the +y-direction and the −y-direction with respect to the position (i, j). When β is an integer of 1 or more and 16 or less, a position of a light source element Lβ is represented by (xβ, yβ).

In step S13, the first color correction circuit 121 obtains the lighting luminance information of the target pixel by using the light source luminance information of the selected s×t light source elements and the attenuation rate distribution information 171.

In step S14, the first color correction circuit 121 determines whether all of the pixels of the first split image data IMA1 have been selected as the target pixels, the process ends when all of the pixels have been selected, and the process returns to step S11 when there is any pixel that has not been selected.

A description will be made with respect to computation processing of the lighting luminance information in step S13. The first color correction circuit 121 obtains the lighting luminance information of the target pixel 22 by using Formulae (3) and (4) below.

$$PL(i, j) = \sum_{\beta=1}^{s\times t} pow(\beta) \times lsf(\beta) \quad (3)$$

$$lsf(\beta) = lsf\left((i - x\beta)^2 + (j - y\beta)^2\right) \quad (4)$$

In Formula (3) above, PL(i, j) indicates the lighting luminance information for the pixel at the position (i, j), pow(β) indicates the light source luminance information determined by the dimmer circuit 150, and lsf(β) indicates an attenuation rate of light with which a light source element Lβ illuminates the target pixel 22. The first color correction circuit 121 obtains lsf(β) by using the attenuation rate distribution information 171. In Formula (4) above, a square of a distance is used as an input to the lookup table, but the distance may be used as an input to the lookup table.

After the loop of steps S2 to S5 in the flow of FIG. 16 is executed up to the last pixel in the luminance information INT, the powu in Formula (2) above is used as pow in Formula (3) above. Even when the loop of steps S2 to S5 is not executed up to the last pixel in the luminance information INT, the updating of the light source luminance information of the light source elements sequentially ends as the target pixel advances, and thus the light source luminance information for which the updating ends may be used as pow.

The first color correction circuit 121 may obtain the lighting luminance information of the target pixel not only from the light source luminance information of the s×t light source elements around the target pixel but also from the light source luminance information of all the light source elements of the backlight 210.

Although the present embodiment has been described in detail above, it will be easily understood by those skilled in the art that various modifications can be made without substantially departing from the novel matters and effects of the present disclosure. Therefore, all such modifications are included in the scope of the present disclosure. For example, the terms described together with different terms having a broader meaning or the same meaning at least once in the specification or the drawings can be replaced with the different terms in any part in the specification or the drawings. Further, all combinations of the present embodiment and the modifications may be within the scope of the present disclosure. Furthermore, the configuration, the operation, and the like of the circuit device, the backlight, the display device, the display system, the processing device, the electronic apparatus, and the like are not limited to those described in the present embodiment, and various modifications can be implemented.

What is claimed is:

1. A circuit device that controls a display device including light source elements and a display panel, the circuit device comprising:

a luminance analysis circuit that performs luminance analysis and resolution reduction on image data of an input image to output luminance information having a resolution lower than a resolution of the input image;

a dimmer circuit that determines, according to the luminance information, light source luminance information indicating light-emission luminance at which each of the light source elements emits light;

a first color correction circuit that performs color correction on first split image data, out of the image data, corresponding to a first area of the display panel, based on the light source luminance information; and a second color correction circuit that performs color correction on second split image data, out of the image data, corresponding to a second area of the display panel, based on the light source luminance information.

2. The circuit device according to claim 1, wherein the dimmer circuit alternately performs an output of the light source luminance information to the first color correction circuit and an output of the light source luminance information to the second color correction circuit.

3. The circuit device according to claim 2, wherein the dimmer circuit outputs the light source luminance information to be used by the first color correction circuit in response to a first request signal from the first color correction circuit, and outputs the light source luminance information to be used by the second color correction circuit in response to a second request signal from the second color correction circuit.

4. The circuit device according to claim 2, wherein an arrangement interval of the light source elements in a horizontal scanning direction is two or more pixels of the display panel.

5. The circuit device according to claim 1, further comprising a splitter circuit that receives the image data, outputs the first split image data to the first color correction circuit, and outputs the second split image data to the second color correction circuit.

6. The circuit device according to claim 1, further comprising a first storage unit that stores first attenuation rate distribution information indicating an attenuation rate distribution of light with respect to a distance between a light source element and a pixel, when the light source element illuminates the pixel, wherein the dimmer circuit reads the first attenuation rate distribution information from the first storage unit and determines the light source luminance information based on the first attenuation rate distribution information and the luminance information.

7. The circuit device according to claim 6, further comprising:

a second storage unit that stores second attenuation rate distribution information indicating the attenuation rate distribution; and a third storage unit that stores third attenuation rate distribution information indicating the attenuation rate distribution, wherein the first color correction circuit reads the second attenuation rate distribution information from the second storage unit and performs color correction on the first split image data based on the second attenuation rate distribution information and the light source luminance information, and the second color correction circuit reads the third attenuation rate distribution information from the third storage unit and performs color correction on the second split image data based on the third attenuation rate distribution information and the light source luminance information.

8. The circuit device according to claim 1, wherein number of pixels in the luminance information is half or less than number of pixels of the image data.

9. The circuit device according to claim 1, wherein the first area is a left area of the display panel, and the second area is a right area of the display panel.

10. A display system comprising:

the circuit device according to claim 1; and the display device.

* * * * *